United States Patent
Butler et al.

(10) Patent No.: US 6,536,322 B1
(45) Date of Patent: Mar. 25, 2003

(54) TOOTH-AND-HOLDER HARVESTING HEAD DISK SAW

(75) Inventors: Jeffrey A. Butler, Aurora, IL (US); Keith B. Hicks, Sandwich, IL (US)

(73) Assignee: Caterpillar Inc, Peoria, IL (US)

( * ) Notice: Subject to any disclaimer, the term of this patent is extended or adjusted under 35 U.S.C. 154(b) by 38 days.

(21) Appl. No.: 09/661,173

(22) Filed: Sep. 13, 2000

(51) Int. Cl.⁷ .............................................. B27B 33/12
(52) U.S. Cl. ........................................ 83/844; 83/840
(58) Field of Search .................. 83/840, 844, 839–845; 144/230; 409/234

(56) References Cited

U.S. PATENT DOCUMENTS

| | | | |
|---|---|---|---|
| 4,706,534 A | 11/1987 | Smolders | |
| 4,744,278 A | * 5/1988 | Wright | 83/839 |
| 4,750,396 A | * 6/1988 | Gaddis et al. | 83/844 |
| 5,044,570 A | * 9/1991 | Montgomery | 241/294 |
| 5,085,112 A | 2/1992 | MacLennan | |
| 5,088,371 A | 2/1992 | MacLennan | |
| 5,211,212 A | 5/1993 | Carlson et al. | |
| 5,269,355 A | 12/1993 | Bowen | |
| 5,377,731 A | * 1/1995 | Wildey | |
| 5,481,952 A | 1/1996 | MacLennan | |
| 5,647,264 A | 7/1997 | Proulx | |
| 5,794,503 A | * 8/1998 | Asada | 83/835 |
| 6,089,480 A | * 7/2000 | Rawlings | 241/73 |
| 6,196,106 B1 | 3/2001 | Kurelek et al. | |
| 6,286,406 B1 | * 9/2001 | Viswanadham et al. | 83/835 |
| 2002/0002892 A1 | * 1/2002 | DiSabatino | |

FOREIGN PATENT DOCUMENTS

| | | | |
|---|---|---|---|
| CA | 557895 | * | 5/1958 |
| DE | 3004867 A1 | | 8/1981 |

* cited by examiner

*Primary Examiner*—Kenneth E. Peterson
(74) *Attorney, Agent, or Firm*—Liza J. Meyers

(57) ABSTRACT

High speed disk saws are used in forestry applications as part of a harvesting head to fell trees. These saws have a saw disk which often becomes dull or damaged through use, so is commonly provided with replaceable teeth and holders. One aspect of the present invention provides a replaceable tooth and holder arrangement with recessed fasteners attaching the holder to the saw disk and the tooth to the holder. Another aspect of the present invention provides a replaceable tooth and holder arrangement with a reversible holder.

10 Claims, 2 Drawing Sheets

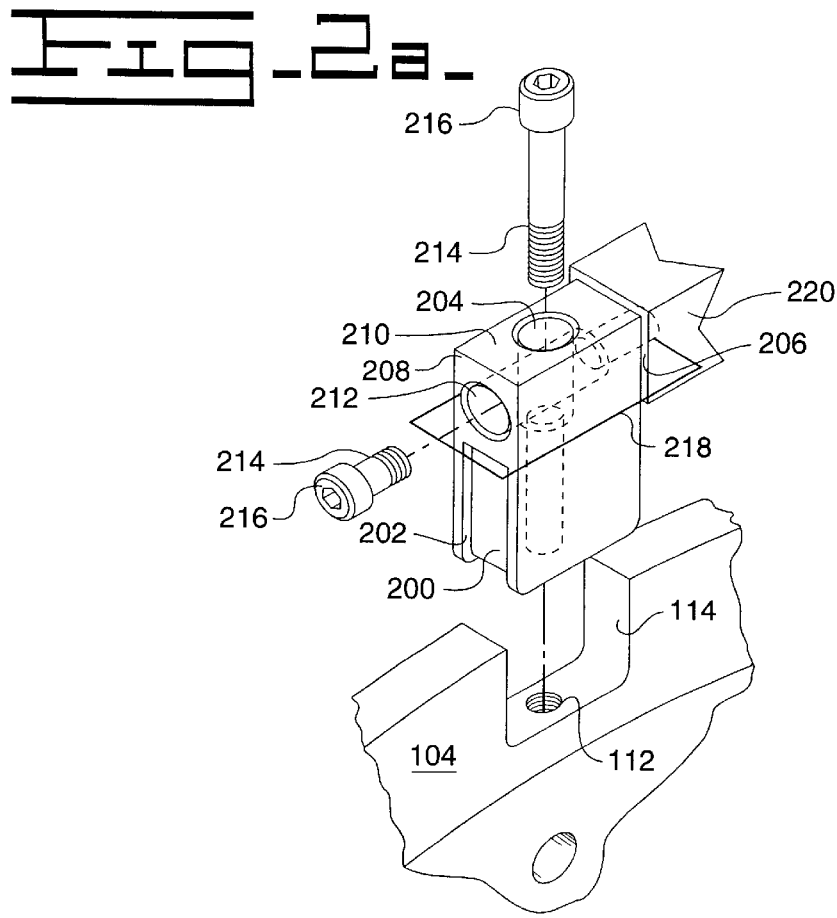
Fig-2a-
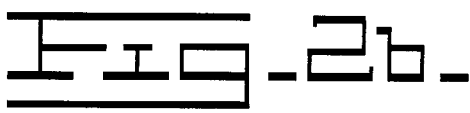
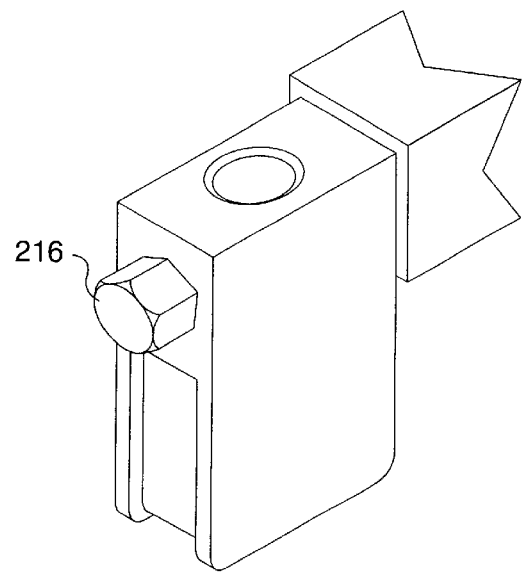
Fig-2b-

TOOTH-AND-HOLDER HARVESTING HEAD DISK SAW

TECHNICAL FIELD

This invention relates generally to a disk saw and more specifically to a tooth and holder arrangement for such a disk saw.

BACKGROUND ART

Logging operations commonly use a work machine, such as a feller-buncher, to harvest trees. These work machines are generally equipped with a harvesting head containing a disk saw, which does the actual cutting of the tree. Due to the hostile operating environment in a forest, the teeth of the disk saw often become dull or break, necessitating sharpening or replacement. The teeth of the disk saw are commonly made to be replaceable and mount to a tooth holder (also separately replaceable) which is then mounted to the disk saw. An example of this type of tooth and holder arrangement is shown in U.S. Pat. No. 5,211,212, issued May 18, 1993 to Carlson et al. (hereafter referenced as '212).

'212 provides for a replaceable holder with two replaceable cutting teeth. The tooth and holder arrangement disclosed in '212 includes many different pieces. Since a forest work site is often in a remote location, the unavailability of one or more of these many pieces can cause undue downtime for a work machine and operator, which can be quite costly. Several of the pieces of the '212 device are also relatively small, requiring the operator to exercise extra caution when replacing the tooth or holder so that the small places do not become misplaced in the debris on the forest floor. Additionally, the head of the bolt attaching the tooth to the holder is located on the leading face of the assembly, which can cause contact damage or debris buildup when the tooth is cutting into a tree. The bolt holding the holder to the saw disk must be precisely aligned with the nut and washer inside an axial hole in the saw disk, and the nut and washer, along with the holder and bolt, can be awkward for the operator to hold and manipulate. Any of these conditions can cause time-consuming and frustrating difficulties when the tooth and/or holder need to be replaced. The axial hole in the saw disk also could be a stress concentrator and weaken the disk. The arrangement of the holder of '212 causes all forces perpendicular to the direction of saw disk travel to be transferred from the holder to the saw disk through the bolt and the dowels shown, which could cause shearing damage to the bolt and dowels.

The present invention is directed to overcoming one or more of the problems as set forth above.

DISCLOSURE OF THE INVENTION

In one aspect of the present invention, a disk saw is provided that has a rim and at least one disk slot. A holder is provided that has a holder bolt hole and that is positioned in a substantially radial direction to the axis A and is aligned with the at least one disk slot.

In another aspect of the present invention, a tooth holder for use in a forestry application is provided. The tooth holder comprises a holder top face, a contoured base face opposite the holder top face, a tooth end face extending between the base face and the holder top face, a holder end face opposite the tooth end face, and at least one inner side face located adjacent to and extending beyond the contoured base face in a direction away from the holder top face.

In another aspect of the present invention, a method for detachably attaching a tooth and holder to a saw disk is disclosed. This method comprises steps of positioning the holder in a disk slot on an edge of the saw disk, mating a contoured holder base face with a contoured disk slot face, overlapping an inner side face of the holder with the disk slot face in direct contact with a rim of the saw disk, inserting a fastener through a holder bolt hole in the holder and into the disk, placing a tooth against the holder, and inserting a fastener through the holder and into the tooth such that it passes through the holder bolt hole.

BRIEF DESCRIPTION OF THE DRAWINGS

FIG. 2a is an exploded perspective view of a tooth, holder, and saw disk of an embodiment of the present invention.

FIG. 2b is a perspective view of a tooth and holder of another embodiment of the present invention.

BEST MODE FOR CARRYING OUT THE INVENTION

Figure 1:
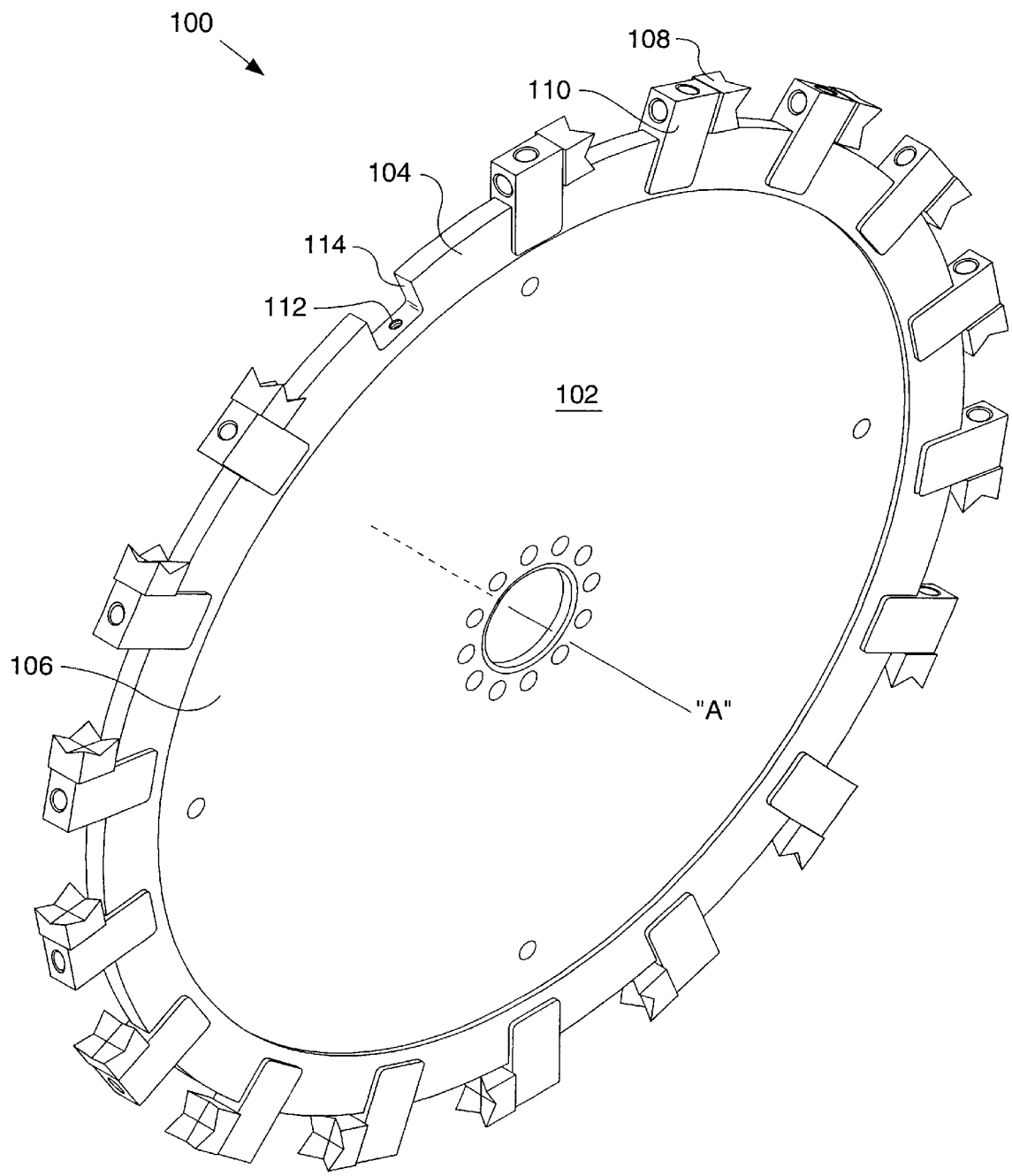
FIG. 1 is a perspective view of a disk saw illustrating an embodiment of the present invention.

A disk saw 100 used in a forestry application is provided, as shown in FIG. 1. The disk saw 100 includes a saw disk 102 having a rim 104 and a center portion 106. The rim 104 is an area generally near the circumference of the saw disk 102. The rim 104 may be thicker than the center portion 106 and may extend beyond the center portion 106 on one or both sides of the saw disk 102, a quality hereafter referenced as "raised". The saw disk 102 is centered about an axis A. The disk saw 100 may be mounted to a harvesting head such that it revolves about the axis A. The disk saw 100 also includes at least one tooth 108 and at least one holder 110, and preferably a plurality of teeth 108 and holders 110 for efficient and balanced cutting.

The saw disk 102 includes one or more disk holes 112. The disk holes 112 penetrate partially into the rim 104 and are associated with one or more disk slots 114. The disk holes 112 may be in a substantially radial direction to the axis A, as shown, or may be tilted relative to the rim 104 without departing from the spirit of the present invention. Each disk hole 112 can be located equidistant from the sides of the rim 104 so that it is centered on the rim 104.

The disk slots 114 are contoured to form a void of a predefined shape in the rim 104 of the saw disk 102. Each disk slot 114 is contoured to accept, in a nesting or mating relationship, a base face 200 of a holder 110. The disk slot 114 may have one of a number of different configurations. An example of a possible configuration is the three-sided disk slot 114 with filleted corners shown in FIG. 2. The parallel sides can be perpendicular to the bottom side or one or both sides can be canted to allow for greater stress distribution from the holder 110. Many disk slot 114 configurations not mentioned could also have advantages, as is obvious to one skilled in the art, and are not excluded by the present invention.

The base face 200 of the holder 110 is adjacent at least one inner side face 202. When the base face 200 is mated and in contact with the disk slot 114, each inner side face 202 contacts the rim 104 of the saw disk 102 in an overlapping relationship. By "overlapping", it is meant that at least a portion of the inner side face 202 is located outside the disk slot 114, as shown in FIGS. 1 and 2a. The holder 110 also includes a holder bolt hole 204, a tooth end face 206, a holder end face 208 opposite the tooth end face 206, a holder top face 210 opposite the base face 200, and a tooth bolt hole 212. The holder bolt hole 204 extends from the holder top face 210 through the holder 110 to the base face 200. The tooth bolt hole 212 extends from the holder end face 208 through the holder 110 to the tooth end face 206.

The holder bolt hole 204 has a decreased radius forming a bolt hole shoulder at a predetermined distance from the holder top face 210. A fastener 214, described here as, but not limited to, a bolt 214 has a bolt head 216. When the base face 200 of the holder 110 is placed into a mating relationship with the disk slot 114, a holder bolt hole 204 meets up with a disk hole 112. There may be more than one holder bolt hole 204 and disk hole 112 pair per holder 110. The fastener 214 is then inserted into the holder bolt hole 204 from the holder top face 210 and engages the disk hole 112. One way that this engagement can be accomplished is that the fastener 214 and one or both of the holder bolt hole 204 and the disk hole 112 is threaded and the fastener 214 threadably engages with the threaded holder bolt hole 204 and/or disk hole 112 in a known manner. When the fastener 214 is tightened to a predetermined torque, the bolt head 216 contacts the bolt hole shoulder (not shown). The distance of the bolt hole shoulder from the holder top face 210 is predetermined to allow the fastener 214 to be fully recessed into the holder bolt hole 204 when the fastener 214 is tightened. The bolt hole shoulder should be located a sufficient distance from the holder top face 210 that the fastener 214, when fully recessed, does not protrude above a bolt hole plane 218 defined parallel to the holder top face 210 and tangent to the portion of the tooth bolt hole 212 furthest from the holder top face 210.

It can also be easily seen that another embodiment of the present invention could use a partial bolt hole (not shown) which does not extend fully through the holder to accept a dowel (not shown) extending from a disk hole 112 in a known manner, in combination with at least one fastener arrangement as described above.

In one embodiment of the present invention, the tooth bolt hole 212 has a decreased radius forming a bolt hole shoulder (not shown) at a predetermined distance from the holder end face 208. A fastener 214, described here as, but not limited to, a bolt 214 has a bolt head 216. When a tooth 108 is placed into a contact with the holder 110, a tooth bolt hole 212 meets up with a tooth hole 220. The fastener 214 is then inserted into the tooth bolt hole 212 from the holder end face 208 and engages the tooth hole 220. One way that this engagement can be accomplished is that the fastener 214 and one or both of the tooth bolt hole 212 and the tooth hole 220 is threaded and the fastener 214 threadably engages with the threaded tooth bolt hole 212 and/or tooth hole 220 in a known manner. When the fastener 214 is tightened to a predetermined torque, the bolt head 216 contacts the bolt hole shoulder. The distance of the bolt hole shoulder from the holder end face 208 is predetermined to allow the fastener 214 to be fully recessed into the tooth bolt hole 212 when the fastener 214 is tightened in this embodiment.

In an alternative embodiment of the present invention, the diameter of the bolt head 216 is larger than the diameter of the tooth bolt hole 212 and the tooth bolt hole 212 does not include a bolt hole shoulder. The bolt head 216 directly contacts the holder end face 208 when tightened. This embodiment enables the holder 110 to be reversible; that is, it can be turned end-to-end such that the holder end face 208 can be interchangeable with the tooth end face 206.

While aspects of the present invention have been particularly shown and described with reference to the preferred embodiments above, it will be understood by those skilled in the art that various additional embodiments may be contemplated without departing from the spirit and scope of the present invention.

Industrial Applicability

In operation, a disk saw 100 has a holder 110 and tooth 108 attached firmly to each disk slot 112 of the saw disk 102. The disk saw 100 rotates rapidly within, for example, a harvesting head carried by a work machine and directed by an operator. As a tooth 108 wears or breaks during use, the operator will stop the machine and turn the disk saw 100 so that the worn or broken tooth 108 is in an accessible location. The operator then removes the debris, if any, that has accumulated in the tooth bolt hole 212 behind the fastener 214 with a simple hand tool such as an awl. The operator then removes the fastener 214 and turns the tooth 108 to an unused side in a known manner. If the tooth 108 does not include an unused side, the operator instead places a new tooth 108 on the holder 110. The operator then inserts the fastener 214 through the tooth bolt hole 212 and into the tooth hole 220. The operator next tightens the fastener 214 until the bolt head 216 contacts the bolt hole shoulder at the predetermined torque and the fastener 214 is wholly inside the tooth bolt hole 212. After the fastener 214 is tightened properly, the disk saw 100 may be placed back into service.

If the holder 110 is damaged or worn and must be replaced, this replacement can be accomplished when the tooth 108 is separated from the holder 110. The operator first removes the debris, if any, that has accumulated in the holder bolt hole 204 behind the fastener 214 with a simple hand tool such as an awl. The fastener 214 is then removed by the operator, which allows the base face 200 of the holder 110 to be disengaged from its mating relationship with the disk slot 114. If the holder 110 is of the reversible type and includes an undamaged side, it may be removed and placed back in a reversed position in the disk slot 114. Otherwise, the operator positions a second holder 110 in the disk slot 114 such that its base face 200 is in a mating relationship with the disk slot 114. This step will cause the inner side face 202 to overlap the disk slot 114 and contact the rim 104 of the saw disk 102. The operator then inserts the fastener 214 through the holder bolt hole 204 and into the disk hole 112. The operator next tightens the fastener 214 until the bolt head 216 contacts the bolt hole shoulder at the predetermined torque and the fastener 214 is wholly inside the holder bolt hole 204. After the fastener 214 is tightened properly, the tooth 108 may be replaced as above and the disk saw 100 may then be placed back into service.

The present invention eliminates multiple small parts with close alignments, which can be easily misplaced in a debris-filled forest environment. One or both of the fasteners 214 is located in a recessed and protected location to avoid damage to the fastener 214. Even if debris should enter the tooth or holder bolt holes 212, 204 atop the fastener 214, it will not pack in tightly. This debris can be easily brushed out by hand or through the use of a hand tool. Damage to the fastener 214 caused by contact with the tree being felled is also avoided. The base face 200 transfers forces in the plane of the disk to the rim 104, while each inner side face 202 transfers forces perpendicular to the plane of the disk to the rim 104.

Other aspects, objects, and advantages of this invention can be obtained from a study of the drawings, the disclosure, and the appended claims.

What is claimed is:

1. A disk saw comprising:
    a saw disk having a rim, an axis A extending through the center of the saw disk in a perpendicular orientation to the rim, at least one disk hole positioned in a substantially radial direction to the axis A, and at least one disk slot on the rim; and at least one holder having a holder bolt hole and at least one inner side face, and being positioned in a mating relationship with the disk slot such that the holder bolt hole is positioned in a substantially radial direction to the axis A and aligned with the at least one disk hole and such that the at least one inner side face contacts the rim of the saw disk on an external side of the saw disk.

2. The disk saw of claim 1, wherein the holder further includes a holder top face, a base face opposite the holder top face, a tooth end face adjacent the holder top face, and the at least one inner side face is located adjacent the base face, and the disk slot is defined by a disk slot face, and the base face of the holder and the disk slot face are each contoured to nest together in a mating relationship with the at least one inner side face overlapping the disk slot and contacting an external side of the saw disk.

3. The disk saw of claim 2, wherein the holder may be positioned in a mating relationship with the disk slot in either of two orientations.

4. The disk saw of claim 1, wherein the saw disk has a center portion and the rim is thicker than the center portion of the saw disk and extends outwardly from at least one side of the saw disk.

5. The disk saw of claim 1, wherein a holder fastener is inserted through the holder bolt hole and into the disk hole.

6. The disk saw of claim 5, wherein the holder has a tooth bolt hole and further including a tooth having a tooth hole positioned adjacent the tooth end face of the holder and fastened thereto by a tooth fastener extending from the tooth bolt hole of the holder and into the tooth hole of the tooth.

7. The disk saw of claim 6, wherein when the holder fastener is tightened, it is recessed into the bolt hole such that none of the holder fastener protrudes into the tooth bolt hole.

8. The disk saw of claim 6, wherein when the tooth fastener is tightened, a bolt head contacts the holder end face.

9. The disk saw of claim 7, wherein at least one of the tooth bolt hole and the tooth hole is threaded and the tooth fastener comprises a bolt having a bolt head, the bolt threadably engaging with the tooth bolt hole and the tooth hole and, when tightened to a predetermined torque, the bolt head is recessed into the tooth bolt hole such that none of the bolt protrudes from the holder end face.

10. A tooth holder for use in a forestry application, comprising:

a holder top face;

a recessed base face opposite the holder top face;

a holder bolt hole extending from the holder top face through the holder to the recessed base face;

a tooth end face extending between the base face and the holder top face;

a holder end face opposite the tooth end face;

a tooth bolt hole extending from the holder end face through the holder to the tooth end face; and at least one inner side face being a wall of the recess of the recessed base face located adjacent and extending beyond the recessed base face.

* * * * *